(12) United States Patent
Intelmann

(10) Patent No.: US 12,488,971 B2
(45) Date of Patent: Dec. 2, 2025

(54) COMPUTER IMPLEMENTED METHOD FOR CALIBRATING A CUSTOMER MASS SPECTROMETRY INSTRUMENT FOR QUANTIFIER-QUALIFIER-RATIO CHECK

(71) Applicant: Roche Diagnostics Operations, Inc., Indianapolis, IN (US)

(72) Inventor: Daniel Intelmann, München Süd (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 451 days.

(21) Appl. No.: 17/992,510

(22) Filed: Nov. 22, 2022

(65) Prior Publication Data

US 2023/0079433 A1 Mar. 16, 2023

Related U.S. Application Data

(63) Continuation of application No. PCT/EP2021/063820, filed on May 25, 2021.

(30) Foreign Application Priority Data

May 26, 2020 (EP) .................................... 20176542

(51) Int. Cl.
*H01J 49/00* (2006.01)
*G01N 33/68* (2006.01)

(52) U.S. Cl.
CPC ................ *H01J 49/0009* (2013.01)

(58) Field of Classification Search
CPC .......... H01J 49/0009; G01N 33/6848
See application file for complete search history.

(56) References Cited

U.S. PATENT DOCUMENTS 11,442,047 B2 9/2022 Sugimoto
2012/0318970 A1* 12/2012 Quimby .............. H01J 49/0036
250/288

(Continued)

FOREIGN PATENT DOCUMENTS

CN 107615057 A 1/2018
CN 108593759 A 9/2018

(Continued)

OTHER PUBLICATIONS

Sage, et. al. AMC LCMS Guide Feb. 2014, âGuide to achieving reliable quantitative LC-MS measurementsâ Chapter 7 Calibration, pp. 44-49. (2013). (Year: 2013).*

(Continued)

*Primary Examiner* — Robert H Kim
*Assistant Examiner* — Laura Eloise Tandy
(74) *Attorney, Agent, or Firm* — Taft Stettinius & Hollister LLP

(57) ABSTRACT

A computer implemented method for calibrating a customer mass spectrometry instrument (118) for quantifier-qualifier-ratio check is proposed. The method comprises the following steps:
a) at least one manufacturer-site standardization, wherein a set of samples of a subject and a set of calibrator samples are measured in multiple replicates on a plurality of mass spectrometry instruments (114), wherein each measurement comprises multiple reaction monitoring with quantifier and qualifier transition for analyte and internal standard, wherein at least three adjustment factors are determined from the measurements of the set of samples of a subject and the set of calibrator samples, wherein a first adjustment factor $\alpha$ depends on a difference between analyte and internal standard, wherein a second adjustment factor $\beta$ depends on a (Continued)

difference between samples of a subject and calibrator samples for analyte quantifier-qualifier-ratio, wherein a third adjustment factor γ depends on a difference between samples of a subject and calibrator samples for the internal standard quantifier-qualifier-ratio;

b) at least one transfer step, wherein the adjustment factors are electronically transferred to a customer mass spectrometry instrument (118);

c) at least one customer-site calibration, wherein the customer-site calibration comprises at least one calibration measurement, wherein a set of calibrator samples is measured on the customer mass spectrometry instrument (118) and quantifier-qualifier-ratios are determined therefrom, wherein target values for quantifier-qualifier-ratios for analyte and for internal standard are set by applying the adjustment factors on the determined quantifier-qualifier-ratios.

9 Claims, 3 Drawing Sheets

(56) References Cited

U.S. PATENT DOCUMENTS

| 2017/0108478 A1 | 4/2017 | Tainaka |
| 2019/0369114 A1 | 12/2019 | Van Eyk et al. |

FOREIGN PATENT DOCUMENTS

| EP | 3425369 A1 | 1/2019 |
| JP | 2011203262 A | 10/2011 |
| JP | 2014235088 A | 12/2014 |
| JP | 2016095253 A | 5/2016 |
| JP | 2016519285 A | 6/2016 |
| JP | 2019074391 A | 5/2019 |
| JP | 2019211301 A | 12/2019 |
| JP | 2020525798 A | 8/2020 |
| WO | 2018136825 A1 | 7/2018 |
| WO | 2018207228 A1 | 11/2018 |
| WO | 2021239692 A1 | 12/2021 |

OTHER PUBLICATIONS

Silke, et. al. âQuantification of steroid hormones in human serum by liquid chromatography-high resolution tandem mass spectrometryâ Journal of Chromatography A. (2017). (Year: 2017).*

International Bureau of WIPO, International Preliminary Report on Patentability issued in corresponding Application No. PCT/EP2021/063820, dated Nov. 17, 2022, 8 pp.

Clarke, William et al., C62-A Liquid Chromatography-Mass Spectrometry Methods; Approved Guideline, Clinical and Laboratory Standards Institute, 2014, 88 pp., vol. 34, No. 16.

Garofolo, Fabio, LC-MS Instrument Calibration, Analytical Method Validation and Instrument Performance Verification, 2004, pp. 197-220, Ch. 13, John Wiley & Sons, Inc.

Huber, Ludwig, Equipment Qualification and Computer System Validation, Analytical Method Validation and Instrument Performance Verification, 2004, pp. 255-276.

International Search Report and Written Opinion of the International Searching Authority, European Patent Office, International Application No. PCT/EP2021/063820, Sep. 14, 2021, 17 pages.

Matysik, Silke et al., Quantification of steroid hormones in human serum by liquid chromatography-high resolution tandem mass spectrometry, Journal of Chromatography A, 2017, pp. 112-118, vol. 1526.

Rigo-Bonnin, Raül et al., Simultaneous Measurement of Cyclosporine A, Everolimus, Sirolimus and Tacrolimus Concentrations in Human Blood by UPLC-MS/MS, Chromatographia, 2015, pp. 1459-1474, vol. 78.

Bousova, Katerina et al., Quantitative multi-residue method for determination antibiotics in chicken meat using turbulent flow chromatography coupled to liquid chromatography-tandem mass spectrometry, Journal of Chromatography A, 2013, pp. 19-27, vol. 1274.

Chinese Search Report, National Intellectual Property Administration, P.R. China, Dec. 18, 2024, 2 pages.

* cited by examiner

COMPUTER IMPLEMENTED METHOD FOR CALIBRATING A CUSTOMER MASS SPECTROMETRY INSTRUMENT FOR QUANTIFIER-QUALIFIER-RATIO CHECK

CROSS-REFERENCE TO RELATED APPLICATIONS

This application is a continuation of International PCT Application No. PCT/EP2021/063820 filed on May 25, 2021, which claims priority to European Patent Application No. 20176542.7 filed on May 26, 2020, the contents of each application are incorporated herein by reference in their entireties.

TECHNICAL FIELD

The invention relates to a computer implemented method for calibrating a customer mass spectrometry instrument for quantifier-qualifier-ratio check, a computer implemented method for quantifier-qualifier-ratio check, computer programs and a mass spectrometry system. The method may be used for in-vitro-diagnostic assays.

BACKGROUND ART

Quantifier-Qualifier peak area ratio, denoted QQ ratio, are known to be an important quality control measure to check peak identity and interferences within every measured patient sample. Using the QQ ratio is a well-established approach for liquid chromatography-mass spectrometry (LC-MS) assays and considered by a number of guidelines, such as from the Clinical & Laboratory Standards Institute (CLSI) C62-A, "Guideline for quality control in forensic-toxicological analyses" by the "Society of Toxicological and Forensic Chemistry" (GTFCh). Target values for QQ ratios for checking peak identity and interferences may be set either during assay development, validation, or with calibrating the assay. Setting of target values is done on a specific instrument. Respective acceptance criteria may be defined during assay development or are just set according to guidelines recommendations.

For example, using QQ ratio as quality measure to check peak identity and interferences is described in US 2017/0108478 A1, WO 2018/207228 A1, WO 2018/136825 A1 and US 20120318970 A1.

Although this ratio is specific for an analyte, robustness deficiencies can be observed, specifically in comparison to peak area ratios between analyte and internal standard. Moreover, there may be distinct differences between different instruments and temporal drifts and shifts. For laboratory devices, target values for this ratio are usually defined after development or during validation or verification on a specific instrument. To overcome the robustness deficiency, broad acceptance ranges may be applied or the target needs to be adjusted with every batch-wise calibration. For fully automated in-vitro-diagnostics run on multiple instruments this approach may not be feasible and suitable.

An overview of usual tuning and calibration routines for mass spectrometry instruments is given by Fabio Garofolo: "LC-MS Instrument Calibration—Chan/Analytical Validation" In: "Analytical Method Validation and Instrument Performance Verification", John Wiley & Sons, Inc., Hoboken, NJ, USA, ISBN: 978-0-471-25953-4, pages 197-220, DOI: 10.1002/0471463728.ch13. An overview of equipment qualification and validation is given by Ludwig Huber et al.: "Equipment Qualification and Computer System Validation: Chan/Analytical Validation" In: "Analytical Method Validation and Instrument Performance Verification", 15 Jan. 2004, John Wiley & Sons, Inc., Hoboken, NJ, USA, ISBN: 978-0-471-25953-4, pages 255-276, DOI: 10.1002/0471463728.ch17.

Problem to be Solved

It is therefore an objective of the present invention to provide methods and devices for quantifier-qualifier-ratio check, which avoid the above-described disadvantages of known methods and devices. In particular, the method and the device shall allow reliable and completely automatic analysis of samples with mass spectrometry devices.

SUMMARY

This problem is addressed by computer implemented methods, computer programs and a mass spectrometry system with the features of the independent claims. Advantageous embodiments which might be realized in an isolated fashion or in any arbitrary combinations are listed in the dependent claims as well as throughout the specification.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a computer implemented method for calibrating a customer mass spectrometry instrument for quantifier-qualifier-ratio check is disclosed.

The term "computer implemented method" as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to the present invention. Preferably several of the method steps may be performed by the computer and/or computer network. The method may be performed partially or completely automatically, specifically without user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

The terms "calibration" and "calibrating" are broad terms and are to be given its ordinary and customary meaning to a person of ordinary skill in the art and are not to be limited to a special or customized meaning. The terms specifically may refer, without limitation, to an operation or a process of operation of determining a relationship, specifically a calibration function, of measurement values delivered by a device with those of a calibration standard. In particular, the calibration may be a relationship between measurement value and target value. The calibration may be a relationship between target value for quantifier-qualifier-ratios from measurements determined with a customer mass spectrometry instrument and target values for quantifier-qualifier-ratios of a calibration standard, in particular determined on a manufacturer-site.

The term "mass spectrometry (MS) instrument" as used herein is a broad term and is to be given its ordinary and customary meaning to a person of ordinary skill in the art and is not to be limited to a special or customized meaning. The term specifically may refer, without limitation, to a mass analyzer configured for detecting at least one analyte based on mass to charge ratio. The mass spectrometry instrument may be or may comprise at least one quadrupole mass spectrometry device. The MS instrument may be a tandem mass spectrometry (MS/MS) instrument or a triple quadrupole MS/MS. Specifically, the mass spectrometry instrument may be configured for Multiple Reaction Monitoring (MRM).

The mass spectrometry instrument may specifically be or may comprise a liquid chromatography mass spectrometry device. The term "liquid chromatography mass spectrometry device" as used herein is a broad term and is to be given its ordinary and customary meaning to a person of ordinary skill in the art and is not to be limited to a special or customized meaning. The term specifically may refer, without limitation, to a combination of liquid chromatography with mass spectrometry. The liquid chromatography mass spectrometry device may be or may comprise at least one high-performance liquid chromatography (HPLC) device or at least one micro liquid chromatography (µLC) device. The liquid chromatography mass spectrometry device may comprise a liquid chromatography (LC) device and a mass spectrometry (MS) device, wherein the LC device and the MS are coupled via at least one interface. The interface coupling a liquid chromatography device and the MS may comprise at least one ionization source configured for generating of molecular ions and for transferring of the molecular ions into the gas phase. The term "liquid chromatography (LC) device" as used herein is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or more analytes with the mass spectrometry instrument. The LC device may be based on any separation principle deemed appropriate by the skilled person; in an embodiment, the LC device may be reverse phase chromatography, hydrophobic interaction chromatography, ion exchange chromatography, size exclusion chromatography, affinity chromatography, or chiral chromatography; in a further embodiment, the LC device is reverse phase chromatography. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest.

The term "multiple reaction monitoring", also denoted multiple transition monitoring, as used herein is a broad term and is to be given its ordinary and customary meaning to a person of ordinary skill in the art and is not to be limited to a special or customized meaning. The term specifically may refer, without limitation, to a method used in mass spectrometry, specifically in tandem mass spectrometry, in which multiple product ions from one or more precursor ions are monitored. As used herein, the term "monitored" is a broad term and is to be given its ordinary and customary meaning to a person of ordinary skill in the an and is not to be limited to a special or customized meaning. The term specifically may refer, without limitation, to determining and/or detecting of multiple product ions.

The term "customer" as used herein is a broad term and is to be given its ordinary and customary meaning to a person of ordinary skill in the art and is not to be limited to a special or customized meaning. The term specifically may refer, without limitation, to an owner or operator of a mass spectrometry instrument, in particular obtained from one or more of a seller, vendor, or supplier. The term "customer mass spectrometry instrument" as used herein is a broad term and is to be given its ordinary and customary meaning to a person of ordinary skill in the art and is not to be limited to a special or customized meaning. The term specifically may refer, without limitation, to a mass spectrometry instrument of the customer.

The term "quantifier", also denoted as quantifier ion, as used herein is a broad term and is to be given its ordinary and customary meaning to a person of ordinary skill in the art and is not to be limited to a special or customized meaning. The term specifically may refer, without limitation, to an ion characterizing a compound of interest. Generally, the most abundant and/or most reliably detected transition or fragment is used for quantifying the compound. Specifically, the quantifier ion may have on a mass spectrum of the compound a peak of a in maximum signal intensity. The term "qualifier", also denoted as qualifier ion, as used herein is a broad term and is to be given its ordinary and customary meaning to a person of ordinary skill in the art and is not to be limited to a special or customized meaning. The term specifically may refer, without limitation, to another ion characterizing the compound of interest having a different mass-to-charge ratio compared to the quantifier ion. The qualifier may be used for confirmation of identity of the compound. Generally, a second transition or fragment used as qualifier. The term "quantifier-qualifier-ratio", also denoted as quantifier-qualifier peak area ratio, as used herein is a broad term and is to be given its ordinary and customary meaning to a person of ordinary skill in the art and is not to be limited to a special or customized meaning. The term specifically may refer, without limitation, to a ratio between signal intensity of the peak of the qualifier ion and the signal intensity of the peak of the quantifier ion and/or to a ratio between peak area of the peak of the quantifier ion and peak area of the peak of the qualifier ion.

The term "quantifier-qualifier-ratio check" as used herein is a broad term and is to be given its ordinary and customary meaning to a person of ordinary skill in the art and is not to be limited to a special or customized meaning. The term specifically may refer, without limitation, to a quality control measure to check peak identity and interferences within a sample. Using the quantifier-qualifier-ratio is a well-established approach for liquid chromatography-mass spectrometry assays and considered by a number of guidelines, such as from the Clinical & Laboratory Standards Institute (CLSI) C62-A, "Guideline for quality control in forensic-toxicological analyses" by the "Society of Toxicological and Forensic Chemistry" (GTFCh). For the quantifier-qualifier-ratio check determined quantifier-qualifier-ratios are compared to target values for quantifier-qualifier-ratios and are validated in view of at least one acceptance criterion.

The term "quality control", as used herein, is known to the skilled person. In an embodiment, quality control is the process of ensuring that processes performed and/or goods produced by an entity are in conformity with pre-defined quality criteria. In a further embodiment, quality control in sample measurement, in particular in measurement of medical samples such as patient samples, e.g. in clinical diagnostics and/or clinical chemistry, comprises ensuring that the analysis results obtained with a specific measuring method correspond to the results obtainable with a gold standard method and, therefore, in an embodiment correspond to the results theoretically obtainable, within a pre-specified range.

The method comprises the following steps which, as an example, may be performed in the given order. It shall be noted, however, that a different order is also possible. Further, it is in also possible to perform one or more of the method steps once or repeatedly. Further, it is possible to perform two or more of the method steps simultaneously or in a timely overlapping fashion. The method may comprise further method steps which are not listed. The term "step" as used herein is a broad term and is to be given its ordinary and customary meaning to a person of ordinary skill in the art and is not to be limited to a special or customized meaning. The term specifically may refer, without limitation, to a work step, a process step or a stage of an operation or a procedure.

The method comprises the following steps:
a) at least one manufacturer-site standardization, wherein a set of samples of a subject and a set of calibrator samples are measured in multiple replicates on a plurality of mass spectrometry instruments, wherein each measurement comprises multiple reaction monitoring with quantifier and qualifier transition for analyte and internal standard, wherein at least three adjustment factors are determined from the measurements of the set of samples of a subject and the set of calibrator samples, wherein a first adjustment factor $\alpha$ depends on a difference between analyte and internal standard, wherein a second adjustment factor $\beta$ depends on a difference between samples of a subject and calibrator samples for analyte quantifier-qualifier-ratio, wherein a third adjustment factor $\gamma$ depends on a difference between samples of a subject and calibrator samples for the internal standard quantifier-qualifier-ratio;
b) at least one transfer step, wherein the adjustment factors are electronically transferred to a customer mass spectrometry instrument;
c) at least one customer-site calibration, wherein the customer-site calibration comprises at least one calibration measurement, wherein a set of calibrator samples is measured on the customer mass spectrometry instrument and quantifier-qualifier-ratios are determined therefrom, wherein target values for quantifier-qualifier-ratios for analyte and for internal standard are set by applying the adjustment factors on the determined quantifier-qualifier-ratios.

For performing a quality check based on quantifier-qualifier-ratios at least one target value is used to which the measured quantifier-qualifier-ratio is compared. However, the target value may change or vary from mass spectrometry instruments to mass spectrometry instruments. Thus, it may be advantageous to use for quality check target values for a specific customer mass spectrometry instrument. Even changes in time are possible. Thus, it may be advantageous to use for quality check target values which may be adjusted or adapted repeatedly in time on the customer-site. Moreover, for calibration usually a low number of calibrator samples is measured and composition of those calibrator samples might be different compared to samples of a subject. Thus, the quality check based on the quantifier-qualifier-ratio would be strongly affected by measurement imprecision and biased by matrix differences between calibrator and samples of a subject. To overcome these issues, the present invention proposes a data transfer approach. On the manufacturer-site a set of samples of a subject and the calibrator samples may be measured in multiple replicates on multiple instruments during step a). Three adjustment factors may be determined in step a) and may be electronically transferred to the customer mass spectrometry instrument in step b). At the customer-site in step c) a calibration measurement may be performed on the calibrator samples and initial target values for the quantifier-qualifier-ratios for analyte and for internal standard may be determined. The adjustment factors may be applied to the initial target values to calculate adjusted target values for analyte and internal standard quantifier-qualifier-ratios. The adjusted target values are instrument specific, traceable to samples of a subject and have a better accuracy due to multiple data points used. Due to assay specific calibration frequency temporal drifts and shifts can be corrected periodically. For subsequent sample analysis at least one acceptance criterion may be used to validate the measured quantifier-qualifier-ratio. The acceptance criterion or a plurality of acceptance criteria may be determined during assay development. The at least one acceptance criterion may be neither instrument specific nor may change over time. The at least one acceptance criterion may be electronically transferred to customer instrument by application parameter file.

The term "manufacturer" as used herein is a broad term and is to be given its ordinary and customary meaning to a person of ordinary skill in the art and is not to be limited to a special or customized meaning. The term specifically may refer, without limitation, to at least one producer of the mass spectrometry instrument. The term "manufacturer" may further refer to a single manufacturer producing all parts of the mass spectrometry instrument and/or to a plurality of manufacturers such as suppliers for specific components of the mass spectrometry instrument. The manufacturer may be the final manufacturer providing the final product for use by a customer. The term "manufacturer" site as used herein is a broad term and is to be given its ordinary and customary meaning to a person of ordinary skill in the art and is not to be limited to a special or customized meaning. The term specifically may refer, without limitation, to all processes which were performed by the manufacturer before providing the mass spectrometry instrument to the customer. All reagents, columns, calibrators, system reagents, disposables may be produced by or for the manufacturer. In contrary at the customer-site, the customer can place samples of a subject and control samples as non-manufacturer components on the instrument.

The term "standardization" as used herein is a broad term and is to be given its ordinary and customary meaning to a person of ordinary skill in the art and is not to be limited to a special or customized meaning. The term specifically may refer, without limitation, to a process of determining an estimation of imprecision of measured quantifier-qualifier-ratios and bias by matrix differences between calibrator and samples of a subject and providing a correction therefor. The standardization may comprise determining for each measurement of a sample a chromatogram. The term "chromatogram" is known to the skilled person. In an embodiment, the term relates to a correlation plot of a quantitative measure of signals obtained from a sample and determined by an MS instrument with the progress of a chromatographic separation, in an embodiment over time, e.g. retention time, and/or elution volume. In an embodiment, said quantitative measure of signals correlates with the concentration of at least part of sample constituents, in particular with the analyte; thus, the quantitative measure of signals may in particular be a signal intensity. The chromatogram may be an MS chromatogram, in a further embodiment an MS/MS chromatogram. As will be understood by the skilled person, the aforesaid representation may be, but does not have to be, a graphical representation; the representation may, however, also be provided e.g. as a list of value pairs, e.g. elution time/quantifier value pairs and/or elution time/qualifier value pairs, or as a mathematical model. Said quantitative measure of signals may comprise an analyte signal intensity and/or an internal standard signal intensity. Said quantitative measure of signals may comprise an analyte quantifier, an internal standard quantifier, an analyte qualifier and/or an internal standard qualifier. Thus, in an embodiment, in particular in case the MS is tandem MS, determining at least one chromatogram comprises measuring at least one of an analyte quantifier, an internal standard quantifier, an analyte qualifier and/or an internal standard qualifier over time and/or elution time, as specified above. As the skilled person understands, elution time may be replaced by any other measure of LC progress deemed appropriate by the skilled person, in particular by elution volume or by retention time.

The term "sample" as used herein is a broad term and is to be given its ordinary and customary meaning to a person of ordinary skill in the art and is not to be limited to a special or customized meaning. The term specifically may refer, without limitation, to any arbitrary sample such as a biological sample. In an embodiment, the sample is a liquid sample, in a further embodiment an aqueous sample. In an embodiment, the sample is selected from the group consisting of a physiological fluid, including blood, serum, plasma, saliva, ocular lens fluid, lacrimal fluid, cerebrospinal fluid, sweat, urine, milk, ascites, mucus, synovial fluid, peritoneal fluid, and amniotic fluid; lavage fluid, tissue, cells, or the like. The sample may, however, also be a natural or industrial liquid, in particular surface or ground water, sewage, industrial wastewater, processing fluid, soil eluates, and the like. In an embodiment, the sample comprises or is suspected to comprise at least one chemical compound of interest, i.e. a chemical which shall be determined, which is referred to as "analyte". The sample may comprise one or more further chemical compounds, which are not to be determined and which are commonly referred to as "matrix". The sample may be used directly as obtained from the respective source or may be subjected to one or more pretreatment and/or a sample preparation step(s). Thus, the sample may be pretreated by physical and/or chemical methods, in an embodiment by centrifugation, filtration, mixing, homogenization, chromatography, precipitation, dilution, concentration, contacting with a binding and/or detection reagent, and/or any other method deemed appropriate by the killed person. In, i.e. before, during, and/or after, the sample preparation step, one or more internal standard(s) may be added to the sample. The sample may be spiked with the internal standard. For example, an internal standard may be added to the sample at a predefined concentration. The internal standard may be selected such that it is easily identifiable under normal operating conditions of a mass spectrometry instrument. The concentration of the internal standard may be pre-determined and significantly higher than the concentration of the analyte.

As used herein, the term "internal standard", in an embodiment, relates to an analyte which is present with a defined concentration in a sample. Thus, in an embodiment, the concentration of the internal standard is known; it is, however, also envisaged that the concentration of the standard is unknown, but is the same for at least the sample of interest and at least one calibration sample; in such case, in an embodiment, the concentration of the internal standard is the same for all samples analyzed. The internal standard, in an embodiment, is structurally similar to the analyte, in a further embodiment is structurally identical to the analyte. In particular in the latter case, in an embodiment, the internal standard is an isotope-labelled molecule, in particular an isotope-labelled version of the analyte, e.g. a $^2H$ (deuterated), $^{15}N$, and/or $^{13}C$-labelled derivative. The internal standard sample may be a sample comprising at least one internal standard substance with a known, e.g. pre-determined, concentration. For further details with respect to the standard sample, reference is made e.g. to EP 3 425 369 A1.

The term "subject" as used herein is a broad term and is to be given its ordinary and customary meaning to a person of ordinary skill in the art and is not to be limited to a special or customized meaning. The term specifically may refer, without limitation, to a mammal. In an embodiment of the invention said subject is a human. Specifically, the subject may be a patient. The patient in accordance with the present invention may, typically, suffer from or shall be suspected to suffer from a disease, i.e. it may already show some or all of the negative symptoms associated with the said disease. The term "sample of a subject" as used herein is a broad term and is to be given its ordinary and customary meaning to a person of ordinary skill in the art and is not to be limited to a special or customized meaning. The term specifically may refer, without limitation, to a biological sample of the subject under test. The set of patient samples may comprise a plurality of different samples of at least one subject. The set of patient sample may be a set of representative samples.

Typically, the set of patient samples may comprise 5 to 30 samples. However, the set of patient samples may comprise more than 30 samples.

The term "calibrator sample", is a broad term and is to be given its ordinary and customary meaning to a person of ordinary skill in the art and is not to be limited to a special or customized meaning. The term specifically may refer, without limitation, to an arbitrary sample having a known concentration of a substance of the calibrator sample. For example, concentration values for the calibrator samples may be determined by a reference laboratory. For example, the calibrator sample may be at least one commercial calibrator. The set of calibrator samples may comprise a plurality of different calibrator samples. The calibrator samples may be or may comprise samples having an assigned target value. For example, the set of calibrator samples may comprise two to three calibrator samples. The set of calibrator samples may comprise at least one calibrator sample. The set of calibrator samples may comprise 4 to 10 calibrator samples.

The term "adjustment factor", is a broad term and is to be given its ordinary and customary meaning to a person of ordinary skill in the art and is not to be limited to a special or customized meaning. The ten specifically may refer, without limitation, to a factor for correcting initial target values for quantifier-qualifier-ratios for analyte and/or for internal standard determined on the customer mass spectrometry instrument for measurement imprecision and bias due to matrix differences between calibrator and samples of a subject.

The method comprises determining at least three adjustment factors from the measurements of the set of samples of a subject and the set of calibrator samples. The method may comprise evaluating the determined chromatograms and determining quantifier-qualifier-ratios therefrom. The evaluating may comprise determining a peak area of the quantifier peak of the chromatogram and determining a peak area of the qualifier peak of the chromatogram. The evaluating may comprise determining a ratio of the peak area of the quantifier peak and the peak area of the qualifier peak. Step a) may comprise determining median quantifier-qualifier-ratios for analyte and internal standard for calibrator samples and samples of a subject for each of the plurality of mass spectrometry instruments. The adjustment factors may be determined by using inter-instrument means. The first adjustment factor $\alpha$ depends on a difference, in particular a relation, between analyte and internal standard. In step a) the first adjustment factor $\alpha$ may be determined by $\alpha = R_{mean,AQN/AQL}/R_{mean,IQN/IQL}$, wherein $R_{mean,AQN/AQL}$ is a mean of the analyte quantifier-qualifier-ratios of the multiple measurements of step a) and $R_{mean,IQN/IQL}$ is a mean of the internal standard quantifier-qualifier-ratios of the multiple measurements of step a). The second adjustment factor $\alpha$ depends on a difference between samples of a subject and calibrator samples for analyte quantifier-qualifier-ratio. In step a) the second adjustment factor $\beta$ may be determined by $\beta = R_{mean,patient,AQN/AQL}/R_{mean,calibrator,AQN/AQL}$, wherein $R_{mean,patient,AQN/AQL}$ is a mean of the analyte quantifier-qualifier-ratios of the multiple measurements of the samples of a subject of step a) and $R_{mean,calibrator,AQN/AQL}$ is a mean of analyte quantifier-qualifier-ratios of the multiple measurements of the calibrator samples of step a). The third adjustment factor $\gamma$ depends on a difference between samples of a subject and calibrator samples for the internal standard quantifier-qualifier-ratio. In step a) the third adjustment factor $\gamma$ may be determined by $\gamma = R_{mean,patient,IQN/IQL}/R_{mean,calibrator,IQN/IQL}$, wherein $R_{mean,patient,IQN/IQL}$ is a mean of the internal standard quantifier-qualifier-ratios of the multiple measurements of the samples of a subject of step a) and $R_{mean,calibrator,IQN/IQL}$ is a mean of internal standard quantifier-qualifier-ratios of the multiple measurements of the calibrator samples of step a).

The term "transfer", is a broad term and is to be given its ordinary and customary meaning to a person of ordinary skill in the art and is not to be limited to a special or customized meaning. The term specifically may refer, without limitation, to unidirectional or bidirectional information exchange, in particular data exchange. The transfer may comprise transferring information from a computational device, e.g. a computer, such as to send or output information, e.g. onto another device. The transfer may be performed via at least ore communication interface. The term "communication interface" as used herein is a broad term and is to be given its ordinary and customary meaning to a person of ordinary skill in the art and is not to be limited to a special or customized meaning. The term specifically may refer, without limitation, to an item or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface. The term "electronically transferring", is a broad term and is to be given its ordinary and customary meaning to a person of ordinary skill in the art and is not to be limited to a special or customized meaning. The term specifically may refer, without limitation, to a transfer using at least one electronic data transfer technique, in particular using at least one transmission protocol. Specifically, the electronic transfer may comprise at least one download of at least one parameter file from a dedicated database. The transfer may comprise that the customer mass spectrometry retrieves information from the manufacturer. The term "retrieving" as used herein is a broad term and is to be given its ordinary and customary meaning to a person of ordinary skill in the art and is not to be limited to a special or customized meaning. The term specifically may refer, without limitation, to receiving data and/or downloading data such as from a data server.

The term "customer-site" calibration is a broad term and is to be given its ordinary and customary meaning to a person of ordinary skill in the art and is not to be limited to a special or customized meaning. The term specifically may refer, without limitation, to a calibration which is conducted by a customer. Thus, the calibration may be conducted without the manufacturer. However, the manufacturer may provide support to the customer if required.

The present invention proposes to split the calibration into two parts. In a first part, at the manufacturer-site a standardization may be performed and, in a second part, a calibration is performed on the customer mass spectrometry instrument. The standardization may be conducted before the customer-site calibration is carried out. The customer-site calibration comprises at least one calibration measurement, wherein a set of calibrator samples is measured on the customer mass spectrometry instrument. The set of calibrator samples used for the customer-site calibration may be identical to the set of calibrator samples used for the manufacturer-site standardization. The set of calibrator samples may be provided by the manufacturer. The calibration measurement may comprise a plurality of measurements such as for a plurality of calibrator samples of the set of calibrator samples and multiple replicates.

The calibration measurement may comprise multiple reaction monitoring with quantifier and qualifier transition for analyte and/or internal standard. The calibration measurement may comprise determining for each measurement of a sample at least one chromatogram. The calibration measurement may comprise determining initial target values for quantifier-qualifier-ratios for analyte and for internal standard. The initial target values may be determined by evaluating chromatograms and determining quantifier-qualifier-ratios therefrom.

The target values for quantifier-qualifier-ratios for analyte and for internal standard are set by applying the adjustment factors on the determined quantifier-qualifier-ratios, also denoted initial target values. In step c), all quantifier-qualifier-ratios determined during the calibration measurement may be used for setting the target values. In particular, all calibrator levels and all calibrator replicates for analyte and internal standard may be used for setting the target values. The target value for the quantifier-qualifier-ratio $\overline{R}$ for analyte quantifier AQN and analyte qualifier AQL may be set by $$\overline{R_{AQN/AQL}} = \beta \cdot \frac{\sum R_{AQN/AQL} + \alpha \cdot \sum R_{IQN/IQL}}{N},$$

with R being a quantifier-qualifier peak area ratio of a single measurement, IQN being an internal standard quantifier, IQL being an internal standard qualifier, and N being a total number of quantifier-qualifier-ratios used for calculation. The target value for a quantifier-qualifier-ratio $\overline{R}$ for internal standard quantifier IQN and internal standard qualifier IQL is set by $$\overline{R_{IQN/IQL}} = \gamma \cdot \frac{\frac{1}{\alpha} \sum R_{AQN/AQL} + \sum R_{IQN/IQL}}{N},$$

with R being a quantifier-qualifier peak area ratio of a single measurement, AQN being an analyte quantifier, AQL being an analyte qualifier, and N being a total number of quantifier-qualifier-ratios used for calculation. These target values may be instrument specific, based on native patient samples and have better accuracy due to multiple data points used. Due to assay specific calibration frequency temporal changes can be corrected periodically.

In a further aspect, a computer implemented method for quantifier-qualifier-ratio check on a customer mass spectrometry instrument is disclosed. The method comprises performing a calibration of the customer mass spectrometry instrument according to a computer implemented method for calibrating a customer mass spectrometry instrument for quantifier-qualifier-ratio check according to the present invention. Thus, for definitions and embodiments of the method for quantifier-qualifier-ratio check reference is made to definitions and embodiments of the method for calibrating a customer mass spectrometry instrument for quantifier-qualifier-ratio check according to the present invention as described in detail above or in more detail below.

The method comprises at least one sample measurement using the customer mass spectrometry instrument. The method further comprises at least one sample analysis step, wherein during sample analysis for every sample measurement quantifier-qualifier-ratios for analyte and/or internal standard are determined and compared to the target values under consideration of at least one acceptance criterion.

The term "sample measurement" as used herein is a broad term and is to be given its ordinary and customary meaning to a person of ordinary skill in the art and is not to be limited to a special or customized meaning. The term specifically may refer, without limitation, to a process of measuring a sample under test using the mass spectrometry instrument. The term "sample analysis" as used herein is a broad term and is to be given its ordinary and customary meaning to a person of ordinary skill in the art and is not to be limited to a special or customized meaning. The term specifically may refer, without limitation, to a process of evaluating the signals of the mass spectrometry instrument. The sample analysis may comprise determining at least one chromatogram. The sample analysis may comprise evaluating the chromatogram and determining the at least one quantifier-qualifier-ratio.

The term "acceptance criterion" as used herein is a broad term and is to be given its ordinary and customary meaning to a person of ordinary skill in the an and is not to be limited to a special or customized meaning. The term specifically may refer, without limitation, to an arbitrary criterion characterizing a quantifier-qualifier-ratio as acceptable or as rejected. The acceptance criterion or a plurality of acceptance criteria may be determined during assay development. The at least one acceptance criterion may be neither instrument specific nor may change over time. The at least one acceptance criterion may be electronically transferred to customer instrument by application parameter file. The acceptance criterion may comprise at least one tolerance limit or tolerance range. The acceptance criterion may be used for peak identity check. The acceptance criterion may be used to distinguish between quantifier ions and interferences. The acceptance criterion may characterize whether or not the quantifier-qualifier-ratios measured with the customer mass spectrometry instrument are appropriate. Quantifier-qualifier-ratios below the tolerance limit or within the tolerance range may be validated. The method further may comprise flagging each of sample measurements which fails the acceptance criterion. Quantifier-qualifier-ratios above the tolerance limit or not within the tolerance range may be flagged and need further review by the operator or user of the customer mass spectrometry instrument.

Further disclosed and proposed herein is a computer program product having program code means, wherein the program code means can be stored or are stored on a storage medium, for performing a computer implemented method for calibrating a customer mass spectrometry instrument for quantifier-qualifier-ratio check according to the present invention and/or a computer implemented method for quantifier-qualifier-ratio check on a customer mass spectrometry instrument according to the present invention, when the pro-gram code means are executed on a computer or on a computer network.

Further disclosed and proposed herein is computer program product having program code means, wherein the program code means can be stored or are stored on a storage medium, for performing a computer implemented method for calibrating a customer mass spectrometry instrument for quantifier-qualifier-ratio check according to the present invention and/or a computer implemented method for quantifier-qualifier-ratio check on a customer mass spectrometry instrument according to the present invention, when the program code means are executed on a computer or on a computer network. Specifically, the program code means may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to c) as indicated above may be performed by using a computer or a computer network, preferably by using a computer program.

Further disclosed and proposed herein is a data carrier having a data structure stored thereon, which, after loading into a computer or computer network, such as into a working memory or main memory of the computer or computer network, may execute one or both of the methods according to one or more of the embodiments disclosed herein.

Further disclosed and proposed herein is a computer program product with program code means stored on a machine-readable carrier, in order to perform one or both of the methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing one or both of the methods according to one or more of the embodiments disclosed herein.

Referring to the computer-implemented aspects of the invention, one or more of the method steps or even all of the method steps of one or both of the methods according to one or more in of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

In a further aspect of the present invention a mass spectrometry system for determining a concentration of at least one analyte in a sample is disclosed. The mass spectrometry system comprising:

a manufacture-site calibration system comprising a plurality of mass spectrometry instruments configured for measuring a set of samples of a subject and a set of calibrator samples in multiple replicates, wherein each of the mass spectrometry instruments is configured for multiple reaction monitoring with quantifier and qualifier transition for analyte and internal standard, wherein the manufacture-site calibration system comprises at least one processing unit configured for determining at least three adjustment factors from the measurements of the set of samples of a subject and the set of calibrator samples, wherein a first adjustment factor $\alpha$ depends on a difference between analyte and internal standard, wherein a second adjustment factor $\beta$ depends on a difference between samples of a subject and calibrator samples for analyte quantifier-qualifier-ratio, wherein a third adjustment factor $\gamma$ depends on a difference between samples of a subject and calibrator samples for the internal standard quantifier-qualifier-ratio;

at least one communication interface configured for electronically transferring the adjustment factors from the manufacture-site calibration system to at least one customer mass spectrometry instrument, and the at least one customer mass spectrometry instrument, wherein the customer mass spectrometry instrument is configured for performing at least one calibration measurement, wherein, in the calibration measurement, a set of calibrator samples is measured on the customer mass spectrometry instrument, wherein the customer mass spectrometry instrument comprises at least one evaluation device configured for determining quantifier-qualifier-ratios from the calibration measurement, wherein the evaluation device is configured for setting target values for quantifier-qualifier-ratios for analyte and for internal standard by applying the adjustment factors on the determined quantifier-qualifier-ratios.

The mass spectrometry instruments may be liquid chromatography mass spectrometer (LC-MS) devices.

The customer mass spectrometry instrument may be configured for performing at least one sample measurement. The evaluation device may be configured for performing at least one sample analysis, wherein during sample analysis for every sample measurement quantifier-qualifier-ratios for analyte and/or internal standard are determined and compared to the target values under consideration of at least one acceptance criterion.

The term "processing unit" as used herein is a broad term and is to be given its ordinary and customary meaning to a person of ordinary skill in the art and is not to be limited to a special or customized meaning. The term specifically may refer, without limitation, to an arbitrary device adapted to perform the method step(s) as described above, in an embodiment by using at least one data processing device and, in a further embodiment, by using at least one processor and/or at least one application-specific integrated circuit. Thus, as an example, the at least one processing unit may comprise at least one data processing unit having a software code stored thereon comprising a number of computer commands. The processing unit may provide one or more hardware elements for performing one or more of the indicated operations and/or may provide one or more processors with software running thereon for performing one or more of the method steps.

The term "evaluation device" as used herein is a broad term and is to be given its ordinary and customary meaning to a person of ordinary skill in the art and is not to be limited to a special or customized meaning. The term specifically may refer, without limitation, to an arbitrary device adapted to perform the method step(s) as described above, in an embodiment by using at least one data processing device and, in a further embodiment, by using at least one processor and/or at least one application-specific integrated circuit.

Thus, as an example, the at least one evaluation device may comprise at least one data processing unit having a software code stored thereon comprising a number of computer commands. The evaluation device may provide one or more hardware elements for performing one or more of the indicated operations and/or may provide one or more processors with software running thereon for performing one or more of the method steps.

The system may be configured for performing a computer implemented method for calibrating a customer mass spectrometry instrument for quantifier-qualifier-ratio check according to the present invention and/or a computer implemented method for quantifier-qualifier-ratio check on a customer mass spectrometry instrument according to the present invention. Thus, for definitions and embodiments of the system reference is made to the embodiments and definitions of the methods according to the present invention as described above and as described in more detail below.

Summarizing and without excluding further possible embodiments, the following embodiments may be envisaged:

Embodiment 1: A computer implemented method for calibrating a customer mass spectrometry instrument for quantifier-qualifier-ratio check, the method comprises the following steps:
- a) at least one manufacturer-site standardization, wherein a set of samples of a subject and a set of calibrator samples are measured in multiple replicates on a plurality of mass spectrometry instruments, wherein each measurement comprises multiple reaction monitoring with quantifier and qualifier transition for analyte and internal standard, wherein at least three adjustment factors are determined from the measurements of the set of samples of a subject and the set of calibrator samples, wherein a first adjustment factor $\alpha$ depends on a difference between analyte and internal standard, wherein a second adjustment factor $\beta$ depends on a difference between samples of a subject and calibrator samples for analyte quantifier-qualifier-ratio, wherein a third adjustment factor $\gamma$ depends on a difference between samples of a subject and calibrator samples for the internal standard quantifier-qualifier-ratio:
- b) at least one transfer step, wherein the adjustment factors are electronically transferred to a customer mass spectrometry instrument;
- c) at least one customer-site calibration, wherein the customer-site calibration comprises at least one calibration measurement, wherein a set of calibrator samples is measured on the customer mass spectrometry instrument and quantifier-qualifier-ratios are determined therefrom, wherein target values for quantifier-qualifier-ratios for analyte and for internal standard are set by applying the adjustment factors on the determined quantifier-qualifier-ratios.

Embodiment 2: The method according to the preceding embodiment, wherein in step c) all quantifier-qualifier-ratios determined during the calibration measurement are used for setting the target values, wherein all calibrator levels and all calibrator replicates for analyte and internal standard are used for setting the target values.

Embodiment 3: The method according to any one the preceding embodiments, wherein the target value for the quantifier-qualifier-ratio R for analyte quantifier AQN and analyte qualifier AQL is set by $$\overline{R_{AQN/AQL}} = \beta \cdot \frac{\sum R_{AQN/AQL} + \alpha \cdot \sum R_{IQN/IQL}}{N},$$

with R being a quantifier-qualifier peak area ratio of a single measurement, IQN being an internal standard quantifier, IQL being an internal standard qualifier, and N being a total number of quantifier-qualifier-ratios used for calculation.

Embodiment 4: The method according to any one the preceding embodiments, wherein the target value for a quantifier-qualifier-ratio $\overline{R}$ for internal standard quantifier IQN and internal standard qualifier IQL is set by $$\overline{R_{IQN/IQL}} = \gamma \cdot \frac{\frac{1}{\alpha} \sum R_{AQN/AQL} + \sum R_{IQN/IQL}}{N},$$

with R being a quantifier-qualifier peak area ratio of a single measurement, AQN being an analyte quantifier, AQL being an analyte qualifier, and N being a total number of quantifier-qualifier-ratios used for calculation.

Embodiment 5: The method according to any one the preceding embodiments, wherein in step a) the first adjustment factor $\alpha$ is determined by $\alpha = R_{mean,AQN/AQL}/R_{mean,IQN/IQL}$, wherein $R_{mean,AQN/AQL}$ is a mean of the analyte quantifier-qualifier-ratios of the multiple measurements of step a) and $R_{mean,IQN/IQL}$ is a mean of the internal standard quantifier-qualifier-ratios of the multiple measurements of step a).

Embodiment 6: The method according to any one the preceding embodiments, wherein in step a) the second adjustment factor $\beta$ is determined by $\beta = R_{mean,patient,AQN/AQL}/R_{mean,calibrator,AQN/AQL}$, wherein $R_{mean,patient,AQN/AQL}$ is a mean of the analyte quantifier-qualifier-ratios of the multiple measurements of the samples of a subject of step a) and $R_{mean,calibrator,AQN/AQL}$ is a mean of analyte quantifier-qualifier-ratios of the multiple measurements of the calibrator samples of step a).

Embodiment 7: The method according to any one the preceding embodiments, wherein in step a) the second adjustment factor $\gamma$ is determined by $\gamma = R_{mean,patient,IQN/IQL}/R_{mean,calibrator,IQN/IQL}$, wherein $R_{mean,patient,IQN/IQL}$ is a mean of the internal standard quantifier-qualifier-ratios of the multiple measurements of the samples of a subject of step a) and $R_{mean,calibrator,IQN/IQL}$ is a mean of internal standard quantifier-qualifier-ratios of the multiple measurements of the calibrator samples of step a).

Embodiment 8: The method according to any one the preceding embodiments, wherein step a) comprises determining median quantifier-qualifier-ratios for analyte and internal standard in for calibrator samples and samples of a subject for each of the plurality of mass spectometry instruments.

Embodiment 9: The method according to the preceding embodiment, wherein the adjustment factors are determined by using inter-instrument means.

Embodiment 10: The method according to any one the preceding embodiments, wherein the mass spectrometry instruments used in steps a) and c) are liquid chromatography mass spectrometer (LC-MS) devices.

Embodiment 11: A computer implemented method for quantifier-qualifier-ratio check on a customer mass spectrometry instrument, wherein the method comprises performing a calibration of the customer mass spectrometry instrument according to a computer implemented method for calibrating a customer mass spectrometry instrument for quantifier-qualifier-ratio check according to any one of the preceding embodiments, wherein the method comprises at least one sample measurement using the customer mass spectrometry instrument, wherein the method further comprises at least one sample analysis step, wherein during sample analysis for every sample measurement quantifier-qualifier-ratios for analyte and/or internal standard are determined and compared to the target values under consideration of at least one acceptance criterion.

Embodiment 12: The method according to the preceding embodiment, wherein the method further comprises flagging each of sample measurements which fails the acceptance criterion.

Embodiment 13: The method according to the preceding embodiment, wherein the method further comprises review of flagged sample measurements.

Embodiment 14: A computer program product having program code means, wherein the program code means can be stored or are stored on a storage medium, for performing a computer implemented method for calibrating a customer mass spectrometry instrument for quantifier-qualifier-ratio check according to any one of the preceding embodiments, referring to a method for calibrating a customer mass spectrometry instrument and/or a computer implemented method for quantifier-qualifier-ratio check on a customer mass spectrometry instrument according to any of the preceding embodiments, referring to a method for quantifier-qualifier-ratio check, when the program code means are executed on a computer or on a computer network.

Embodiment 15: A computer program product having program code means, wherein the program code means can be stored or are stored on a storage medium, for performing a computer implemented method for calibrating a customer mass spectrometry instrument for quantifier-qualifier-ratio check according to any one of the preceding embodiments, referring to a method for calibrating a customer mass spectrometry instrument and/or a computer implemented method for quantifier-qualifier-ratio check on a customer mass spectrometry instrument according to any of the preceding embodiments, referring to a method for quantifier-qualifier-ratio check, when the program code means are executed on a computer or on a computer network.

Embodiment 16: A mass spectrometry system for determining a concentration of at least one analyte in a sample comprising:
 a manufacture-site calibration system comprising a plurality of mass spectrometry instruments configured for measuring a set of samples of a subject and a set of calibrator samples in multiple replicates, wherein each of the mass spectrometry instruments is configured for multiple reaction monitoring with quantifier and qualifier transition for analyte and internal standard, wherein the manufacture-site calibration system comprises at least one processing unit configured for determining at least three adjustment factors from the measurements of the set of samples of a subject and the set of calibrator samples, wherein a first adjustment factor α depends on a difference between analyte and internal standard, wherein a second adjustment factor β depends on a difference between samples of a subject and calibrator samples for analyte quantifier-qualifier-ratio, wherein a third adjustment factor γ depends on a difference between samples of a subject and calibrator samples for the internal standard quantifier-qualifier-ratio;
 at least one communication interface configured for electronically transferring the adjustment factors from the manufacture-site calibration system to at least one customer mass spectrometry instrument, and
 the at least one customer mass spectrometry instrument, wherein the customer mass spectrometry instrument is configured for performing at least one calibration measurement, wherein, in the calibration measurement, a set of calibrator samples is measured on the customer mass spectrometry instrument, wherein the customer mass spectrometry instrument comprises at least one evaluation device configured for determining quantifier-qualifier-ratios from the calibration measurement, wherein the in evaluation device is configured for setting target values for quantifier-qualifier-ratios for analyte and for internal standard by applying the adjustment factors on the determined quantifier-qualifier-ratios.

Embodiment 17: The system according to the preceding embodiment, wherein the system is configured for performing a computer implemented method for calibrating a customer mass spectrometry instrument for quantifier-qualifier-ratio check according to any one of the preceding embodiments, referring to a method for calibrating a customer mass spectrometry instrument and/or a computer implemented method for quantifier-qualifier-ratio check on a customer mass spectrometry instrument according to any of the preceding embodiments, referring to a method for quantifier-qualifier-ratio check.

Embodiment 18: The system according to any one of the preceding embodiments referring to a system, wherein the mass spectrometry instruments are liquid chromatography mass spectrometer (LC-MS) devices.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
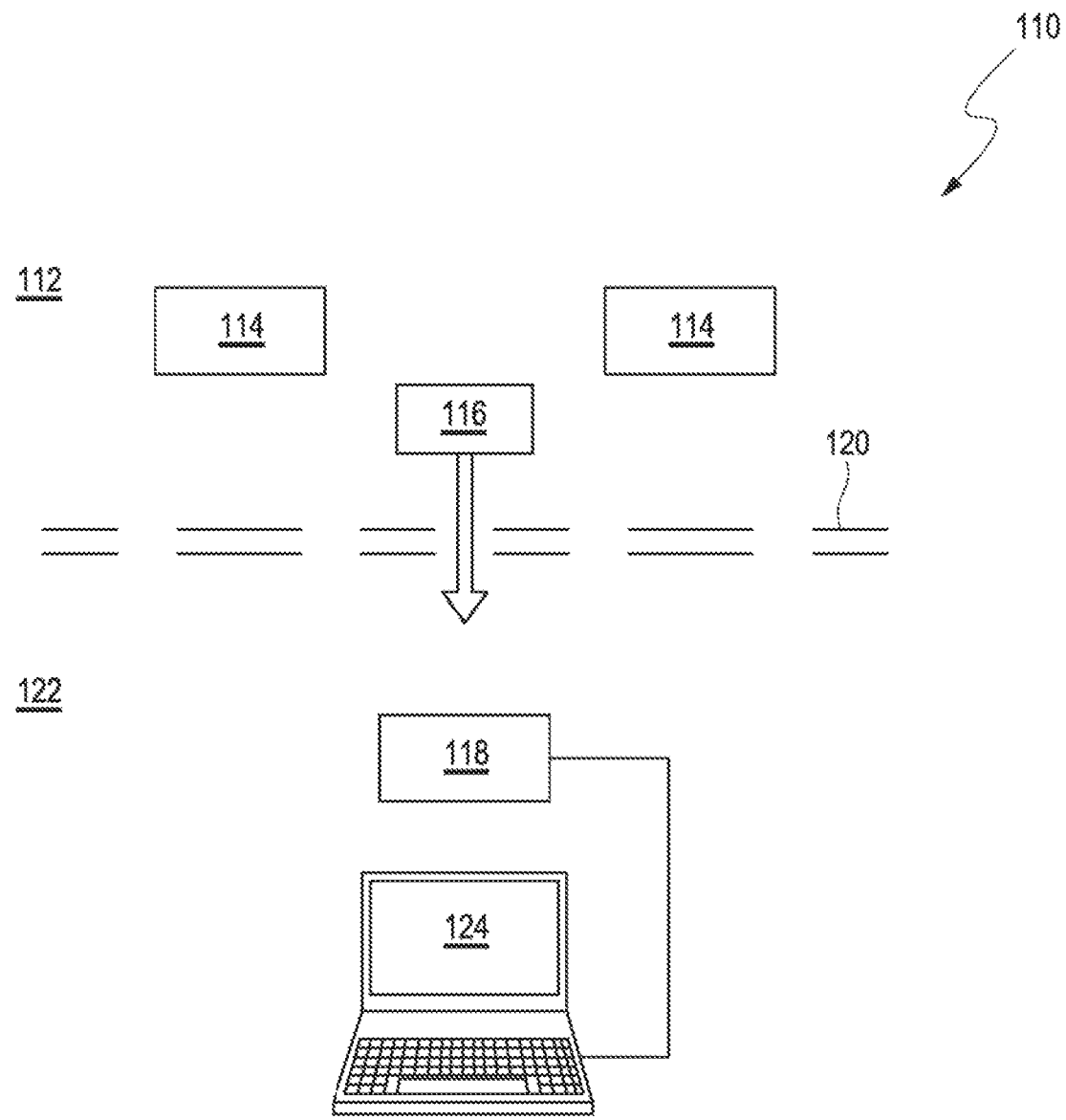
FIG. 1 shows an embodiment of a mass spectrometry system according to the present invention.

FIG. 1 shows an embodiment of a mass spectrometry system 110 according to the present invention. The mass spectrometry system 110 comprises a manufacture-site calibration system 112 comprising a plurality of mass spectrometry instruments 114 configured for measuring a set of samples of a subject and a set of calibrator samples in multiple replicates. Each of the mass spectrometry instruments 114 is configured for multiple reaction monitoring with quantifier and qualifier transition for analyte and internal standard. The mass spectrometry (MS) instruments 114 may be mass analyzers configured for detecting at least one analyte based on mass to charge ratio. Each of the mass spectrometry instruments 114 may be or may comprise at least one quadrupole mass spectrometry device. The MS instruments 114 may be tandem mass spectrometry (MS/MS) instruments or triple quadrupole MS/MS. Specifically, the mass spectrometry instruments 114 may be configured for Multiple Reaction Monitoring (MRM).

The mass spectrometry instruments 114 may specifically be or may comprise a liquid chromatography mass spectrometry device. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, wherein the LC device and the MS are coupled via at least one interface. The interface coupling a liquid chromatography device and the MS may comprise at least one ionization source configured for generating of molecular ions and for transferring of the molecular ions into the gas phase. The liquid chromatography (LC) device may be configured to separate one or more analytes of interest of a sample from other components of the sample for detection of the one or more analytes with the mass spectrometry instrument 114. The LC device may be based on any separation principle deemed appropriate by the skilled person; in an embodiment, the LC device may be reverse phase chromatography, hydrophobic interaction chromatography, ion exchange chromatography, size exclusion chromatography, affinity chromatography, or chiral chromatography; in a further embodiment, the LC device is reverse phase chromatography. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest.

The manufacturer may be at least one producer of the mass spectrometry instrument 114. The manufacturer may be a single manufacturer producing all parts of the mass spectrometry instrument 114 and/or to a plurality of manufacturers such as suppliers for specific components of the mass spectrometry instrument 114. The manufacturer may be the final manufacturer providing the final product for use by a customer. The manufacturer-site" as used herein is a broad term and is to be given its ordinary and customary meaning to a person of ordinary skill in the art and is not to be limited to a special or customized meaning. The term specifically may refer, without limitation, to all processes which were performed by the manufacturer before providing the mass spectrometry instrument to the customer. All reagents, columns, calibrators, system reagents, disposables may be produced by or for the manufacturer. In contrary at the customer-site, the customer can place samples of a subject and control samples as non-manufacturer components on the instrument.

The manufacture-site calibration system 112 comprises at least one processing unit 116 configured for determining at least three adjustment factors from the measurements of the set of samples of a subject and the set of calibrator samples. The processing unit 116 may be adapted to determining the three adjustment factors by using at least one data processing device and, in a further embodiment, by using at least one processor and/or at least one application-specific integrated circuit. Thus, as an example, the at least one processing unit 116 may comprise at least one data processing unit having a software code stored thereon comprising a number of computer commands. The processing unit 116 may provide one or more hardware elements for performing one or more of the indicated operations and/or may provide one or more processors with software running thereon for performing the determining of the adjustment factors.

The adjustment factors may be determined during a manufacturer-site standardization. The standardization may be or may comprise a process of determining an estimation of imprecision of measured quantifier-qualifier-ratios and bias by matrix differences between calibrator and samples of a subject and providing a correction therefor. The standardization may comprise determining for each measurement of a sample a chromatogram. The chromatogram may be a correlation plot of a quantitative measure of signals obtained from a sample in and determined by an MS instrument 114 with the progress of a chromatographic separation, in an embodiment over time, e.g. retention time, and/or elution volume. In an embodiment, said quantitative measure of signals correlates with the concentration of at least pan of sample constituents, in particular with the analyte; thus, the quantitative measure of signals may in particular be a signal intensity. The chromatogram may be an MS chromatogram, in a further embodiment an MS/MS chromatogram. As will be understood by the skilled person, the aforesaid representation may be, but does not have to be, a graphical representation; the representation may, however, also be provided e g, as a list of value pairs, e.g. elution time/quantifier value pairs and/or elution time/qualifier value pairs, or as a mathematical model. Said quantitative measure of signals may comprise an analyte signal intensity and/or an internal standard signal intensity. Said quantitative measure of signals may comprise an analyte quantifier, an internal standard quantifier, an analyte qualifier and/or an internal standard qualifier. Thus, in an embodiment, in particular in case the MS is tandem MS, determining at least one chromatogram comprises measuring at least one of an analyte quantifier, an internal standard quantifier, an analyte qualifier and/or an internal standard qualifier over time and/or elution time, as specified above. As the skilled person understands, elution time may be replaced by any other measure of LC progress deemed appropriate by the skilled person, in particular by elution volume or by retention time.

The adjustment factors may be or may comprise factors for correcting initial target values for quantifier-qualifier-ratios for analyte and/or for internal standard determined on a customer mass spectrometry instrument 118 for measurement imprecision and bias due to matrix differences between calibrator and samples of a subject. The processing unit 116 may be configured for determining at least three adjustment factors from the measurements of the set of samples of a subject and the set of calibrator samples. The processing unit may be configured for evaluating the determined chromatograms and determining quantifier-qualifier-ratios therefrom. The processing unit 116 may be or may comprise at least one evaluation device. The evaluating may comprise determining a peak area of the quantifier peak of the chromatogram and determining a peak area of the qualifier peak of the chromatogram. The evaluating may comprise determining a ratio of the peak area of the quantifier peak and the peak area of the qualifier peak. The processing unit 116 may be configured for determining median quantifier-qualifier-ratios for analyte and internal standard for calibrator samples and samples of a subject for each of the plurality of mass spectrometry instruments. The adjustment factors may be determined by using inter-instrument means. The first adjustment factor α depends on a difference between analyte and internal standard. The first adjustment factor α may be determined by $\alpha = R_{mean,AQN/AQL}/R_{mean,IQN/IQL}$ wherein $R_{mean,AQN/AQL}$ is a mean of the analyte quantifier-qualifier-ratios of the multiple measurements and $R_{mean,IQN/IQL}$ is a mean of the internal standard quantifier-qualifier-ratios of the multiple measurements. The second adjustment factor J depends on a difference between samples of a subject and calibrator samples for analyte quantifier-qualifier-ratio. The second adjustment factor β may be determined by $\beta = R_{mean,patient,AQN/AQL}/R_{mean,calibrator,AQN/AQL}$, wherein $R_{mean,patient,AQN/AQL}$ is a mean of the analyte quantifier-qualifier-ratios of the multiple measurements of the samples of a subject and $R_{mean,calibrator,AQN/AQL}$ is a mean of analyte quantifier-qualifier-ratios of the multiple measurements of the calibrator samples. The third adjustment factor γ depends on a difference between samples of a subject and calibrator samples for the internal standard quantifier-qualifier-ratio. The third adjustment factor γ may be determined by $\gamma = R_{mean,patient,IQN/IQL}/R_{mean,calibrator,IQN/IQL}$ wherein $R_{mean,patient,IQN/IQL}$ is a mean of the internal standard quantifier-qualifier-ratios of the multiple measurements of the samples of a subject and $R_{mean,calibrator,IQN/IQL}$ is a mean of internal standard quantifier-qualifier-ratios of the multiple measurements of the calibrator samples.

The mass spectrometry system 110 comprises at least one communication interface 120 configured for electronically transferring the adjustment factors from the manufacture-site calibration system 112 to the customer mass spectrometry instrument 118. In FIG. 1, the communication interface 120 is denoted as two dashed lines. The transfer may be a unidirectional or bidirectional information exchange, in particular data exchange. The transfer may comprise transferring information from a computational device. e.g. a computer, such as to send or output information, e g, onto another device. The communication interface 120 may form a boundary configured for transferring information. In particular, the communication interface 120 may be configured for transferring information from a computational device, e.g. a computer, such as to send or output information. e.g. onto another device. Additionally or alternatively, the communication interface 120 may be configured for transferring information onto a computational device, e.g. onto a computer, such as to receive information.

The communication interface 120 may specifically provide means for transferring or exchanging information. In particular, the communication interface 120 may provide a data transfer connection, e.g. Bluetooth. NFC, inductive coupling or the like. As an example, the communication interface 120 may be or may comprise at least one port comprising one or more of a network or internet port, a USB-port and a disk drive. The communication interface 120 may be at least one web interface. The electronic transferring may be performed by using at least one electronic data transfer technique, in particular using at least one transmission protocol. Specifically, the electronic transfer may comprise at least one download of at least one parameter file from a dedicated database. The transfer may comprise that the customer mass spectrometry 118 retrieves information from the manufacturer such as by receiving data and/or downloading data such as from a data server.

The mass spectrometry system 110 comprises the at least one customer mass spectrometry instrument 118. The customer mass spectrometry instrument 118 is located at a customer site 122. The customer mass spectrometry instrument 118 is configured for performing at least one calibration measurement, wherein, in the calibration measurement, a set of calibrator samples is measured on the customer mass spectrometry instrument 118. The customer mass spectrometry instrument 118 comprises at least one evaluation device 124 configured for determining quantifier-qualifier-ratios from the calibration measurement. The evaluation device 124 is configured for setting target values for quantifier-qualifier-ratios for analyte and for internal standard by applying the adjustment factors on the determined quantifier-qualifier-ratios.

The target values for quantifier-qualifier-ratios for analyte and for internal standard are set by applying the adjustment factors on the determined quantifier-qualifier-ratios, also denoted initial target values. All quantifier-qualifier-ratios determined during the calibration measurement may be used for setting the target values. In particular, all calibrator levels and all calibrator replicates for analyze and internal standard may be used for setting the target values. The target value for the quantifier-qualifier-ratio $\overline{R}$ for analyte quantifier AQN and analyte qualifier AQL may be set by $$\overline{R_{AQN/AQL}} = \beta \cdot \frac{\sum R_{AQN/AQL} + \alpha \cdot \sum R_{IQN/IQL}}{N},$$

with R being a quantifier-qualifier peak area ratio of a single measurement, IQN being an internal standard quantifier, IQL being an internal standard qualifier, and N being a total number of quantifier-qualifier-ratios used for calculation. The target value for a quantifier-qualifier-ratio $\overline{R}$ for internal standard quantifier IQN and internal standard qualifier IQL is set by $$\overline{R_{IQN/IQL}} = \gamma \cdot \frac{\frac{1}{\alpha}\sum R_{AQN/AQL} + \sum R_{IQN/IQL}}{N},$$

with R being a quantifier-qualifier peak area ratio of a single measurement, AQN being an analyte quantifier, AQL being an analyte qualifier, and N being a total number of quantifier-qualifier-ratios used for calculation. These target values may be instrument specific, based on native patient samples and have better accuracy due to multiple data points used. Due to assay specific calibration frequency temporal changes can be corrected periodically.

The customer mass spectrometry instrument 118 may be configured for performing at least one sample measurement. The evaluation device 124 may be configured for performing at in least one sample analysis, wherein during sample analysis for every sample measurement quantifier-qualifier-ratios for analyte and/or internal standard are determined and compared to the target values under consideration of at least one acceptance criterion.

The mass spectrometry system 110 may be configured for performing a quality check based on quantifier-qualifier-ratios. For the quality check based on quantifier-qualifier-ratios at least one target value is used to which the measured quantifier-qualifier-ratio is compared. However, the target value may change or vary from mass spectrometry instruments to mass spectrometry instruments. Thus, it may be advantageous to use for quality check target values for a specific customer mass spectrometry instrument. Even changes in time are possible. Thus, it may be advantageous to use for quality check target values which may be adjusted or adapted repeatedly in time on the customer-site. Moreover, for calibration usually a low number of calibrator samples is measured and composition of those calibrator samples might be different compared to samples of a subject. Thus, the quality check based on the quantifier-qualifier-ratio would be strongly affected by measurement imprecision and biased by matrix differences between calibrator and samples of a subject. To overcome these issues, the present invention proposes a data transfer approach. On the manufacturer-site 112 a set of samples of a subject and the calibrator samples may be measured in multiple replicates on multiple instruments. Three adjustment factors may be determined and may be electronically transferred to the customer mass spectrometry instrument 118. At the customer-site 122 a calibration measurement may be performed on the calibrator samples and initial target values for the quantifier-qualifier-ratios for analyte and for internal standard may be determined. The adjustment factors may be applied to the initial target values to calculate adjusted target values for analyte and internal standard quantifier-qualifier-ratios. The adjusted target values are instrument specific, traceable to samples of a subject and have a better accuracy due to multiple data points used. Due to assay specific calibration frequency temporal drifts and shifts can be corrected periodically. For subsequent sample analysis at least one acceptance criterion may be used to validate the measured quantifier-qualifier-ratio.

The acceptance criterion may characterize a quantifier-qualifier-ratio as acceptable or as rejected. The acceptance criterion or a plurality of acceptance criteria may be determined during assay development. The at least one acceptance criterion may be neither instrument specific nor may change over time. The at least one acceptance criterion may be electronically transferred to customer instrument by application parameter file. The acceptance criterion may comprise at least one tolerance limit or tolerance range. The acceptance criterion may be used for peak identity check. The acceptance criterion may be used to distinguish between quantifier ions and interferences. The acceptance criterion may characterize whether or not the quantifier-qualifier-ratios measured with the customer mass spectrometry instrument 118 are appropriate. Quantifier-qualifier-ratios below the tolerance limit or within the tolerance range may be validated. The method further may comprise flagging each of sample measurements which fails the acceptance criterion. Quantifier-qualifier-ratios above the tolerance limit or not within the tolerance range may be flagged and need further review by the operator or user of the customer mass spectrometry instrument.

The present invention proposes to split the calibration into two parts. In a first part, at the 211 manufacturer-site 112 a standardization may be performed and, in a second part, a calibration is performed on the customer mass spectrometry instrument 118. The standardization may be conducted before the customer-site calibration is carried out. The customer-site calibration comprises at least one calibration measurement, wherein a set of calibrator samples is measured on the customer mass spectrometry instrument 118. The set of calibrator samples used for the customer-site calibration may be identical to the set of calibrator samples used for the manufacturer-site standardization. The set of calibrator samples may be provided by the manufacturer. The calibration measurement may comprise a plurality of measurements such as for a plurality of calibrator samples of the set of calibrator samples and multiple replicates. The calibration measurement may comprise multiple reaction monitoring with quantifier and qualifier transition for analyte and/or internal standard. The calibration measurement may comprise determining for each measurement of a sample at least one chromatogram. The calibration measurement may comprise determining initial target values for quantifier-qualifier-ratios for analyte and for internal standard. The initial target values may be determined by evaluating chromatograms and determining quantifier-qualifier-ratios therefrom.

Figure 2:
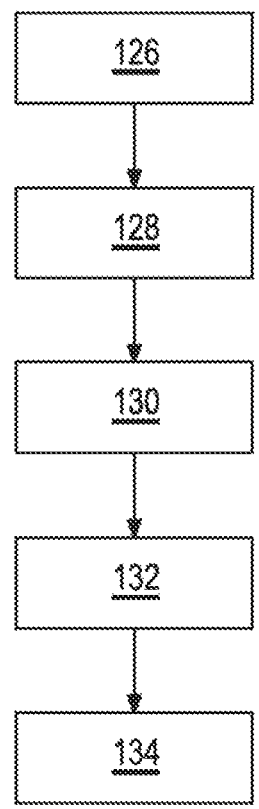
FIG. 2 shows a flow char of a computer implemented method for calibrating a customer mass spectrometry instrument for quantifier-qualifier-ratio check according to the present invention and a computer implemented method for quantifier-qualifier-ratio check on a customer mass spectrometry instrument according to the present invention.

FIG. 2 shows a flow chart of a computer implemented method for calibrating a customer mass spectrometry instrument 118 for quantifier-qualifier-ratio check according to the present invention and a computer implemented method for quantifier-qualifier-ratio check on a customer mass spectrometry instrument 118 according to the present invention. The method comprises the following steps:

a) (denoted with reference number 126) at least one manufacturer-site standardization, wherein a set of samples of a subject and a set of calibrator samples are measured in multiple replicates on a plurality of mass spectrometry instruments 114, wherein each measurement comprises multiple reaction monitoring with in quantifier and qualifier transition for analyte and internal standard, wherein at least three adjustment factors are determined from the measurements of the set of samples of a subject and the set of calibrator samples, wherein a first adjustment factor $\alpha$ depends on a difference between analyte and internal standard, wherein a second adjustment factor $\beta$ depends on a difference between samples of a subject and calibrator samples for analyte quantifier-qualifier-ratio, wherein a third adjustment factor $\gamma$ depends on a difference between samples of a subject and calibrator samples for the internal standard quantifier-qualifier-ratio:

b) (denoted with reference number 128) at least one transfer step, wherein the adjustment factors are electronically transferred to a customer mass spectrometry instrument 118;

c) (denoted with reference number 130) at least one customer-site calibration, wherein the customer-site calibration comprises at least one calibration measurement, wherein a set of calibrator samples is measured on the customer mass spectrometry instrument 118 and quantifier-qualifier-ratios are determined therefrom, wherein target values for quantifier-qualifier-ratios for analyte and for internal standard are set by applying the adjustment factors on the determined quantifier-qualifier-ratios.

The computer implemented method for quantifier-qualifier-ratio check on the customer mass spectrometry instrument 118 comprises steps a) to c). In addition, the method for quantifier-qualifier-ratio check comprises at least one sample measurement (denoted with reference number 132) using the customer mass spectrometry instrument 118. The method further comprises at least one sample analysis step (denoted with reference number 134), wherein during sample analysis for every sample measurement quantifier-qualifier-ratios for analyte and/or internal standard are determined and compared to the target values under consideration of at least one acceptance criterion.

Figure 3:
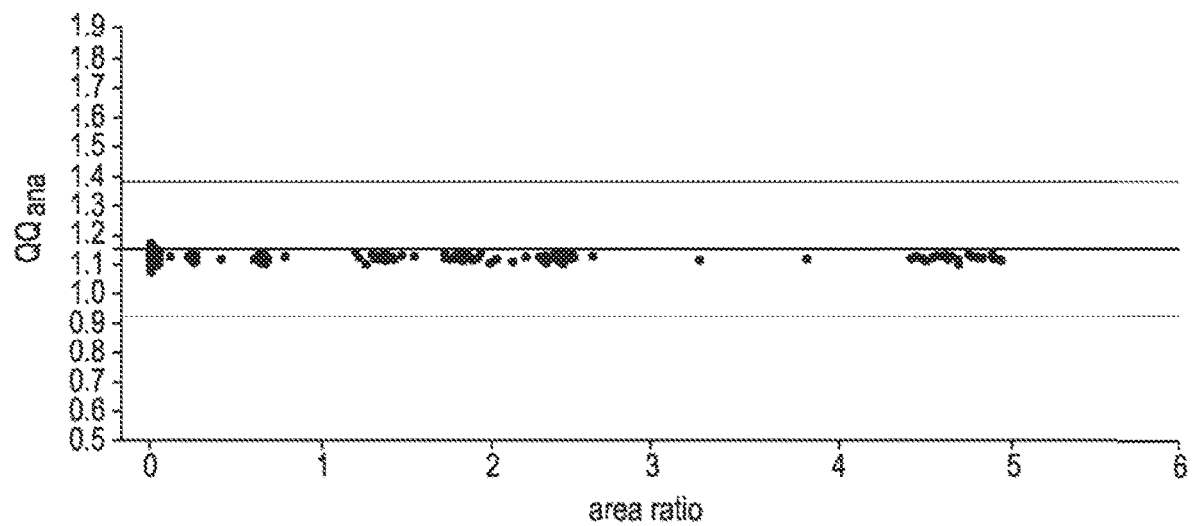
FIGS. 3A and 3B experimental results.
Figure 3:
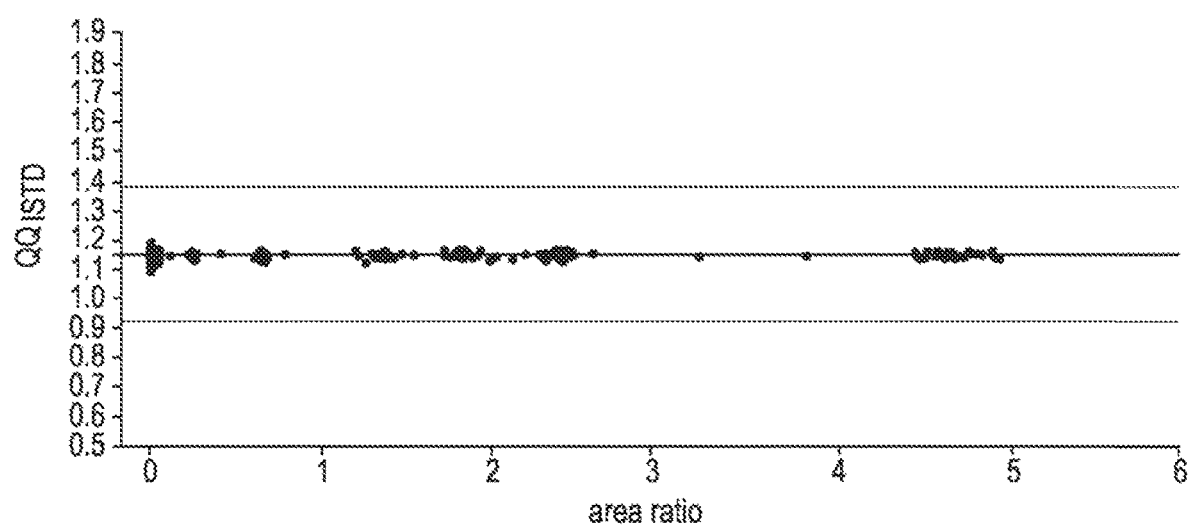

FIGS. 3A and 3B show experimental results of a testosterone test case, in particular an LCMS assay for testosterone quantification in human serum or plasma. Automated sample preparation was done on a robotic workstation, LC separation was done on a commercial HPLC system, and mass spectrometric detection was done by multiple reaction monitoring with quantifier and qualifier transition for analyte and internal standard, respectively. For the manufacturer-site standardization on two mass spectrometry instruments 114 for two days two replicates calibrators and patient samples were measured. Median quantifier-qualifier-ratios for calibrators and patient samples on both mass spectrometry instruments 114 were calculated.

| LCMS System | Sample Type | Median (QQ-ratio analyte) | Median (QQ-ratio ISTD) |
|---|---|---|---|
| I | Calibrator | 1.174 | 1.151 |
| I | Patient sample | 1.176 | 1.146 |
| II | Calibrator | 1.144 | 1.168 |
| II | Patient sample | 1 147 | 1.168 |

By using inter-instrument means the adjustment factors α, β, γ were determined:
α=1.001
β=1.003
γ=0.998.

On the customer-site 122, sample measurement under customer conditions were performed. On the customer's mass spectrometry instrument 118 for one day three replicates of the two calibrator levels were measured und used for calibration and setting of the target values. 30 patient samples were measured over 10 days in multiple replicates and a quantifier-qualifier-ratio check was applied.

| QQ-ratio check | analyte | Internal standard |
|---|---|---|
| Target values | 1.15 | 1.14 |
| Acceptance range (±20%) | ±0.23 | ±0.23 |

FIGS. 3A and 3B show the experimental results for the testosterone test case. FIG. 3A shows the quantifier-qualifier-ratio for the analyte $QQ_{area}$ as a function of an area ratio. The area ratio is a ratio of peak area of the analyte quantifier and of the internal standard quantifier. FIG. 3B shows the quantifier-qualifier-ratio for the internal standard $QQ_{ISTD}$ as a function of the of the area ratio. The solid lines show the target values for analyte 1.15 and for internal standard 1.14. Moreover, the acceptance range off 20% is depicted. It is shown that the target values for analyte 1.15 and for internal standard 1.14 determined with the adjustment factors from the manufacturer-site standardization are suitable for the whole measurement range of the customer mass spectrometry instrument.

LIST OF REFERENCE NUMBERS 110 mass spectrometry system
112 manufacturer-site
114 mass spectrometry instruments
116 processing unit
118 mass spectrometry instrument
120 communication interface
122 customer-site
124 evaluation device
126 manufacturer-site standardization
128 transfer step,
130 customer-site calibration
132 sample measurement
134 sample analysis step

The invention claimed is:

1. A computer-implemented method for calibrating a customer mass spectrometry instrument for quantifier-qualifier-ratio check, the method comprising:
a) performing at least one manufacturer-site standardization, wherein a set of samples of a subject and a set of calibrator samples are measured in multiple replicates on a plurality of mass spectrometry instruments which constitute multiple measurements, wherein each measurement comprises multiple reaction monitoring with quantifier and qualifier transition for analyte and internal standard, wherein at least three adjustment factors are determined from the measurements of the set of samples of a subject and the set of calibrator samples, wherein a first adjustment factor α depends on a difference between analyte and internal standard, wherein the first adjustment factor α is determined by $\alpha=R_{mean,AQN/AQL}/R_{mean,IQN/IQL}$, wherein $R_{mean,AQN/AQL}$ is a mean of the analyte quantifier-qualifier-ratios of the multiple measurements of step a) and $R_{mean,IQN/IQL}$ is a mean of the internal standard quantifier-qualifier-ratios of the multiple measurements of step a),
wherein a second adjustment factor β depends on a difference between samples of a subject and calibrator samples for analyte quantifier-qualifier-ratio, wherein the second adjustment factor β is determined by $\beta=R_{mean,patient,AQN/AQL}/R_{mean,calibrate,AQN/AQL}$, wherein $R_{mean,patient,AQN/AQL}$ is a mean of the analyte quantifier-qualifier-ratios of the multiple measurements of the samples of a subject of step a) and $R_{mean,calibrator,AQN/AQL}$ is a mean of analyte quantifier-qualifier-ratios of the multiple measurements of the calibrator samples of step a), and
wherein a third adjustment factor γ depends on a difference between samples of a subject and calibrator samples for the internal standard quantifier-qualifier-ratio, wherein the third adjustment factor γ is determined by $\gamma=R_{mean,patient,IQN/IQL}/R_{mean,calibrator,IQN/IQL}$, wherein $R_{mean,patient,IQN/IQL}$ is a mean of the internal standard quantifier-qualifier-ratios of the multiple measurements of the samples of a subject of step a) and $R_{mean,calibrator,IQN/IQL}$ is a mean of internal standard quantifier-qualifier-ratios of the multiple measurements of the calibrator samples of step a),
b) performing at least one transfer step in which the adjustment factors are electronically transferred to a customer mass spectrometry instrument, and
c) performing at least one customer-site calibration, wherein the customer-site calibration comprises at least one calibration measurement, wherein a set of calibrator samples is measured on the customer mass spectrometry instrument and quantifier-qualifier-ratios are determined therefrom, wherein target values for quantifier-qualifier-ratios for analyte and for internal standard are set by applying the adjustment factors on the determined quantifier-qualifier-ratios, wherein the target value for the quantifier-qualifier-ratio $\bar{R}$ for analyte quantifier AQN and analyte qualifier AQL is set by $$\overline{R_{AQN/AQL}} = \beta \cdot \frac{\sum R_{AQN/AQL} + \alpha \cdot \sum R_{IQN/IQL}}{N},$$

with R being a quantifier-qualifier peak area ratio of a single measurement, IQN being an internal standard quantifier, IQL being an internal standard qualifier, and N being a total number of quantifier-qualifier-ratios used for calculation, wherein the target value for a quantifier-qualifier-ratio R for internal standard quantifier ION and internal standard qualifier IQL is set by $$\overline{R_{IQN/IQL}} = \gamma \cdot \frac{\frac{1}{\alpha}\sum R_{AQN/AQL} + \sum R_{IQN/IQL}}{N},$$

with R being a quantifier-qualifier peak area ratio of a single measurement, AQN being an analyte quantifier, AQL being an analyte qualifier, and N being a total number of quantifier-qualifier-ratios used for calculation.

2. The method according to claim 1, wherein in step c) all quantifier-qualifier-ratios determined during the calibration measurement are used for setting the target values, and wherein all calibrator levels and all calibrator replicates for analyte and internal standard are used for setting the target values.

3. The method according to claim 1, wherein step a) comprises determining median quantifier-qualifier-ratios for analyte and internal standard for calibrator samples and samples of a subject for each of the plurality of mass spectrometry instruments, and wherein the adjustment factors are determined by using inter-instrument means.

4. The method according to claim 1, wherein at least one sample measurement is obtained using the customer mass spectrometry instrument, and further comprising performing at least one sample analysis step, wherein during sample analysis for every sample measurement quantifier-qualifier-ratios for analyte and/or internal standard are determined and compared to the target values under consideration of at least one acceptance criterion.

5. The method according to claim 4, wherein the method further comprises flagging each of sample measurements that fails the acceptance criterion.

6. The method according to claim 5, wherein the method further comprises reviewing flagged sample measurements.

7. A mass spectrometry system for determining a concentration of at least one analyte in a sample comprising:
a manufacture-site calibration system comprising:
  a plurality of mass spectrometry instruments configured to measure a set of samples of a subject and a set of calibrator samples in multiple replicates, wherein each of the mass spectrometry instruments of the plurality of mass spectrometry instruments is configured to perform multiple reaction monitoring with quantifier and qualifier transition for analyte and internal standard, and
  at least one processing unit configured to determine at least three adjustment factors from the measurements of the set of samples of a subject and the set of calibrator samples,
    wherein a first adjustment factor α depends on a difference between analyte and internal standard, wherein the first adjustment factor α is determined by $\alpha = R_{mean,AQN/AQL}/R_{mean,IQN/IQL}$, wherein $R_{mean,AQN/AQL}$ is a mean of the analyte quantifier-qualifier-ratios of the multiple measurements of step a) and $R_{mean,IQN/IQL}$ is a mean of the internal standard quantifier-qualifier-ratios of the multiple measurements of step a),
    wherein a second adjustment factor β depends on a difference between samples of a subject and calibrator samples for analyte quantifier-qualifier-ratio, wherein the second adjustment factor β is determined by $\beta = R_{mean,patient,AQN/AQL}/R_{mean,calibrator,AQN/AQL}$, wherein $R_{mean,patient,AQN/AQL}$ is a mean of the analyte quantifier-qualifier-ratios of the multiple measurements of the samples of a subject of step a) and $R_{mean,calibrator,AQN/AQL}$ is a mean of analyte quantifier-qualifier-ratios of the multiple measurements of the calibrator samples of step a), and
    wherein a third adjustment factor γ depends on a difference between samples of a subject and calibrator samples for the internal standard quantifier-qualifier-ratio, wherein the third adjustment factor γ is determined by $\gamma = R_{mean,patient,AQN/AQL}/R_{mean,calibrator,IQN/IQL}$, wherein $R_{mean,patient,IQN/IQL}$ is a mean of the internal standard quantifier-qualifier-ratios of the multiple measurements of the samples of a subject of step a) and $R_{mean,calibrator,IQN/IQL}$ is a mean of internal standard quantifier-qualifier-ratios of the multiple measurements of the calibrator samples of step a),
at least one communication interface configured to electronically transfer the adjustment factors from the manufacture-site calibration system to at least one customer mass spectrometry instrument, and
the at least one customer mass spectrometry instrument, wherein the at least one customer mass spectrometry instrument is configured to perform at least one calibration measurement, wherein, in the calibration measurement, a set of calibrator samples is measured on the at least one customer mass spectrometry instrument, wherein the at least one customer mass spectrometry instrument comprises at least one evaluation device configured to determine quantifier-qualifier-ratios from the calibration measurement, wherein the evaluation device is configured to set target values for quantifier-qualifier-ratios for analyte and for internal standard by applying the adjustment factors on the determined quantifier-qualifier-ratios, wherein the target value for the quantifier-qualifier-ratio $\overline{R}$ for analyte quantifier AQN and analyte qualifier AQL is set by $$\overline{R_{AQN/AQL}} = \beta \cdot \frac{\sum R_{AQN/AQL} + \alpha \cdot \sum R_{IQN/IQL}}{N},$$

with R being a quantifier-qualifier peak area ratio of a single measurement, IQN being an internal standard quantifier, IQL being an internal standard qualifier, and N being a total number of quantifier-qualifier-ratios used for calculation, wherein the target value for a quantifier-qualifier-ratio $\overline{R}$ for internal standard quantifier IQN and internal standard qualifier IQL is set by $$\overline{R_{IQN/IQL}} = \gamma \cdot \frac{\frac{1}{\alpha}\sum R_{AQN/AQL} + \sum R_{IQN/IQL}}{N},$$

with R being a quantifier-qualifier peak area ratio of a single measurement, AQN being an analyte quantifier, AQL being an analyte qualifier, and N being a total number of quantifier-qualifier-ratios used for calculation.

8. The mass spectrometry system according to claim 7, wherein the mass spectrometry system is configured to perform a computer-implemented method for calibrating a customer mass spectrometry instrument for quantifier-qualifier-ratio check.

9. The mass spectrometry system according to claim 7, wherein the mass spectrometry instruments are liquid chromatography mass spectrometer (LC-MS) devices.

* * * * *